(12) United States Patent
Shibahara

(10) Patent No.: US 8,063,791 B2
(45) Date of Patent: Nov. 22, 2011

(54) ELECTRONIC APPARATUS AND CONTROL METHOD

(75) Inventor: Akihito Shibahara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 210 days.

(21) Appl. No.: 12/621,381

(22) Filed: Nov. 18, 2009

(65) Prior Publication Data

US 2010/0219972 A1 Sep. 2, 2010

(30) Foreign Application Priority Data

Feb. 27, 2009 (JP) ................. 2009-047303

(51) Int. Cl.
*G08B 5/00* (2006.01)
(52) U.S. Cl. ............... 340/815.4; 340/907; 340/916; 340/438; 340/458; 340/459; 340/330; 340/332
(58) Field of Classification Search ............ 340/907, 340/916, 438, 458, 459, 330, 332, 815.4
See application file for complete search history.

(56) References Cited

U.S. PATENT DOCUMENTS

2007/0106915 A1  5/2007 Shie

FOREIGN PATENT DOCUMENTS

| JP | 2002-367270 A | 12/2002 |
| JP | 2003-078800 A | 3/2003 |
| JP | 2003-298976 A | 10/2003 |
| JP | 2004-030144 A | 1/2004 |
| JP | 2007-128482 A | 5/2007 |
| JP | 2008-005406 A | 1/2008 |
| JP | 2008-299265 A | 12/2008 |

OTHER PUBLICATIONS

Explanation of Non-English Language References.
Notice of Rejection mailed by Japan Patent Office on Feb. 9, 2010 in the corresponding Japanese Patent Application No. 2009-047303.
Notice of Rejection mailed by Japan Patent Office on Jun. 1, 2010 in the corresponding Japanese Patent Application No. 2009-047303.

*Primary Examiner* — Daryl Pope
(74) *Attorney, Agent, or Firm* — Knobee Martens Olson & Bear LLP

(57) ABSTRACT

According to one embodiment, an electronic apparatus includes: an indicator configured to indicate an operation status of a device; a switch configured to receive an input; a time determination module configured to determine whether an input time during which the input is continually received by the switch exceeds a predetermined first time; a lighting controller, when the time determination module determines that the input time passes the first time, configured to control the indicator so as to be turned on in a first lighting pattern; a detector configured to detect an end of the input received by the switch; and a processor, when the time determination module determines that the input time is greater than or equal to the first time and the detector detects the end of the input received by the switch, configured to perform predetermined first processing.

5 Claims, 13 Drawing Sheets

FIG.13

| INITIALIZATION FLAG | INDICATOR COLOR | INITIALIZATION TARGET |
|---|---|---|
| 1 | GREEN | DECODER |
| 2 | BLUE | TUNER |
| 3 | RED | HDD CONTROLLER |

…

ELECTRONIC APPARATUS AND CONTROL METHOD

CROSS-REFERENCE TO RELATED APPLICATIONS

This application is based upon and claims the benefit of priority from Japanese Patent Application No. 2009-047303, filed Feb. 27, 2009, the entire contents of which are incorporated herein by reference.

BACKGROUND

1. Field

One embodiment of the invention relates to an electronic apparatus that performs processing based on a user input, and a control method thereof.

2. Description of the Related Art

Recently, digitalization of television (TV) broadcasting has been in progress, and a digital TV broadcasting receiver having a decoder and the like for processing a digital signal of a digital broadcasting is widespread.

In the digital TV broadcasting receiver, decoder process becomes unstable for some reasons while the decoder processes the digital signal. For example, the decoder becomes uncontrollable when the communication fails between the decoder and a microcomputer (TV microcomputer) that controls a system.

In order to fix operation of the digital TV broadcasting receiver having the unstable decoder, the decoder should be initialized.

However, power supply to the conventional digital TV broadcasting receiver cannot be stopped even when a power button on a main body of the digital TV broadcasting receiver is pressed down, or in other words, even when the main power of the receiver is shut down. For example, the TV microcomputer that controls a remote controller, a switch provided on a front panel, and the like, supplies power to the decoder based on a state of the digital TV broadcasting receiver, and the TV microcomputer communicates with the decoder to power on and off the decoder.

Therefore, when the communication between the TV microcomputer and the decoder fails as mentioned before, the TV microcomputer may not be able to initialize the decoder. Hence, the receiver is required to be unplugged to entirely shut down the power supply and initialize the digital TV broadcasting receiver.

However, in some cases it is difficult to unplug the receiver because, for example, the plug of the receiver is hard to distinguish from other plugs. Japanese Patent Application Publication (KOKAI) No. 2002-367270 therefore discloses a technique to reset (initialize) the microcomputer when a certain button is kept pressed down for a predetermined time length.

However, the conventional technology does not provide any information during the time from when the button is pressed until when the initialization starts. Hence, it is difficult to know the time it takes from when the button is pressed, and it is also difficult to know if the processing (resetting) is to be performed.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 13 is an initialization management table in the second embodiment;

DETAILED DESCRIPTION

Various embodiments according to the invention will be described hereinafter with reference to the accompanying drawings. In general, according to one embodiment of the invention, an electronic apparatus, includes: an indicator configured to indicate an operation status of a device; a switch configured to receive an input; a time determination module configured to determine whether an input time during which the input is continually received by the switch exceeds a predetermined first time; a lighting controller configured to, when the time determination module determines that the input time passes the first time, control the indicator so as to be turned on in a first lighting pattern; a detector configured to detect an end of the input received by the switch; and a processor configured to, when the time determination module determines that the input time is greater than or equal to the first time and the detector detects the end of the input received by the switch, perform predetermined first processing.

According to another embodiment of the invention, a control method of an electronic apparatus having an indicator and a switch, the indicator configured to indicate an operation status of a device, the switch configured to receive an input, the control method includes: a time determination module determining whether an input time during which the input is continually received by the switch exceeds a predetermined first time; a lighting controller, when the time determination module determines that the input time passes the first time, controlling the indicator so as to be turned on in a first lighting pattern; a detector detecting an end of the input received by the switch; and a processor, when the time determination module determines that the input time is greater than or equal to the first time and the detector detects the end of the input received by the switch, performing predetermined first processing.

Figure 1:
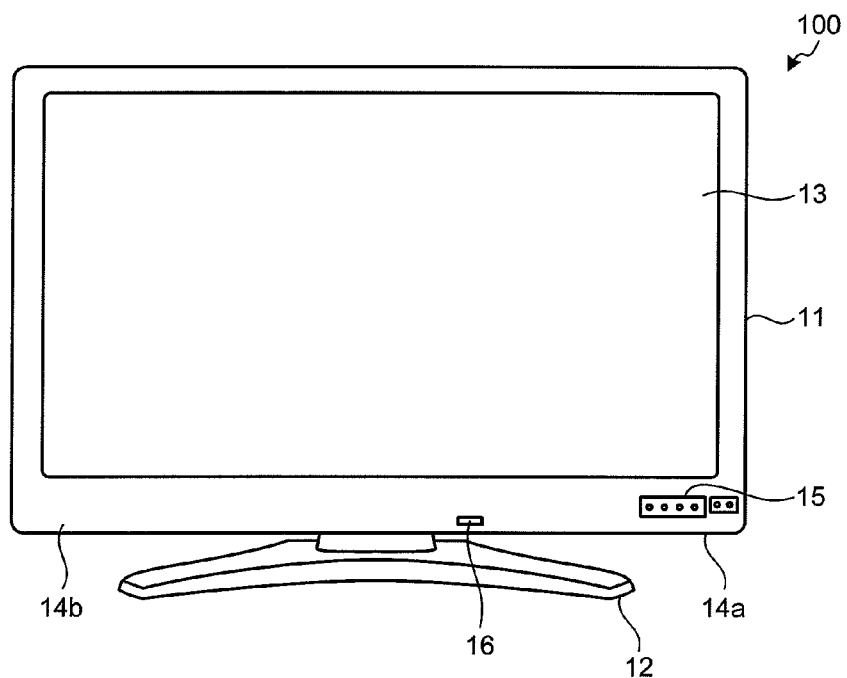
FIG. 1 is an exemplary front view of a digital TV broadcasting receiver according to a first embodiment of the invention.

FIG. 1 is a front view of a digital TV broadcasting receiver 100 according to a first embodiment.

As illustrated in FIG. 1, the digital TV broadcasting receiver 100 has a thin cabinet 11 and a stand 12. The thin cabinet 11 is formed approximately in a rectangular shape, and forming a main body of the receiver. The stand 12 supports the thin cabinet 11 in a manner so that the thin cabinet 11 stands up.

The cabinet 11 has a flat liquid crystal display (LCD) panel 13, a right speaker 14a, a left speaker 14b, an indicator light module 15, and a light receiver 16 that receives operation information transmitted from a remote controller.

Figure 2:
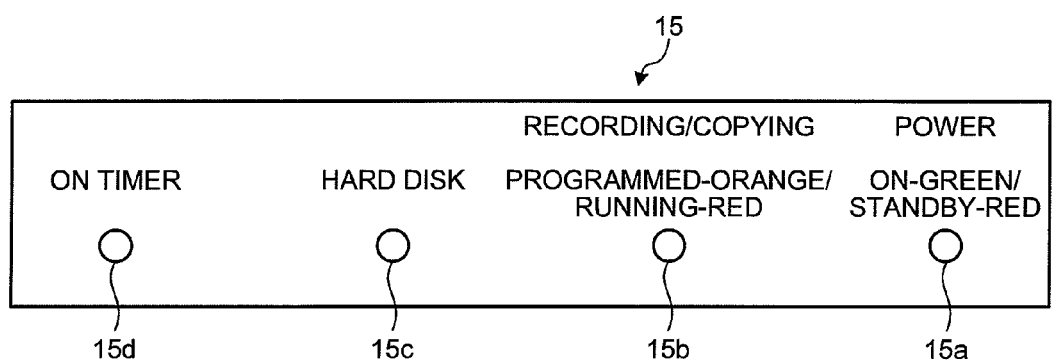
FIG. 2 is an exemplary diagram of an indicator light module of the digital TV broadcasting receiver in the first embodiment.

FIG. 2 is a schematic diagram of the indicator light module 15. As illustrated in FIG. 2, in the first embodiment, the indicator light module 15 includes a plurality of light emitting diode (LED) indicators that indicate various operation modes (statuses) of the digital TV broadcasting receiver 100. As illustrated in FIG. 2, the indicator light module 15 has a power indicator 15a, a recording/copying indicator 15b, a hard disk indicator 15c, and an on-timer indicator 15d. The power indicator 15a is turned on and off to indicate a power supply status of the digital TV broadcasting receiver 100 to which the power is supplied from a power source of the digital TV broadcasting receiver 100.

The recording/copying indicator 15b is turned on and off to indicate whether recording/copying is currently being performed by the digital TV broadcasting receiver 100. The hard disk indicator 15c is turned on and off to indicate an operation status of a hard disk. The on-timer indicator 15d is turned on and off to indicate whether a timer recording or an auto play is preset.

Figure 3:
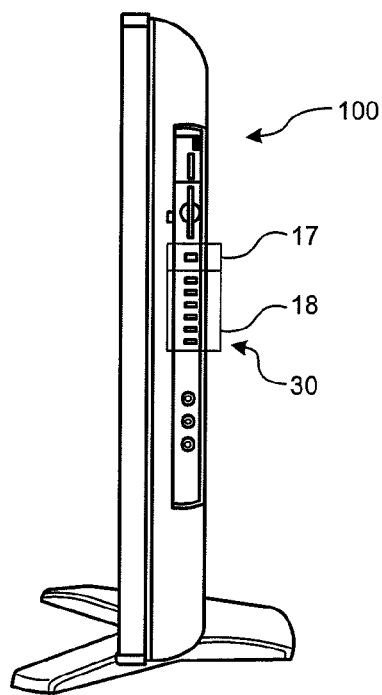
FIG. 3 is an exemplary side view of the digital TV broadcasting receiver in the first embodiment.

FIG. 3 is a side view of the digital TV broadcasting receiver 100 according to the first embodiment.

As illustrated in FIG. 3, an operation section 30 having a power switch 17 and various operation switch 18 are provided on a side face of the cabinet 11 of the digital TV broadcasting receiver 100. The power switch 17 turns on and off the power supply to the digital TV broadcasting receiver 100.

Figure 4:
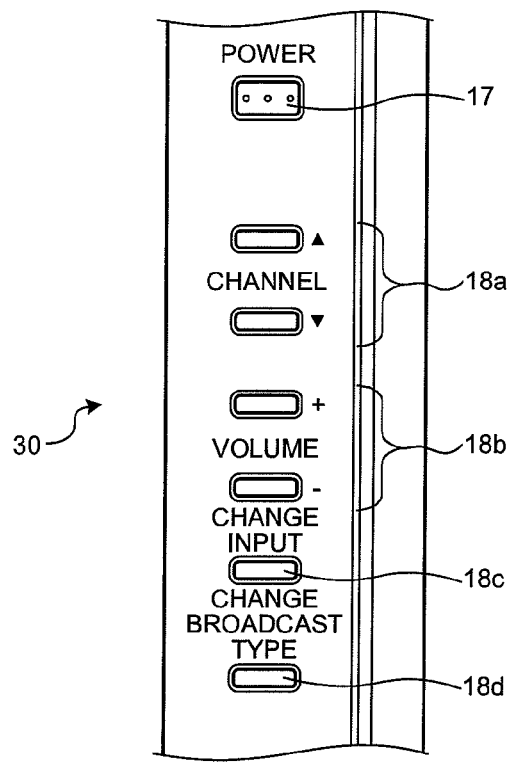
FIG. 4 is an exemplary diagram of an operation section on a side face of the digital TV broadcasting receiver in the first embodiment.

FIG. 4 is a schematic diagram of the operation section 30. As illustrated in FIG. 4, in addition to the power switch 17, the operation section 30 has a channel button 18a, a volume button 18b, an input change button 18c, and a broadcasting type change button 18d, as the various operation switch 18. Since the various switches function in similar manner as that of the conventional ones, the explanations thereof are omitted.

Figure 5:
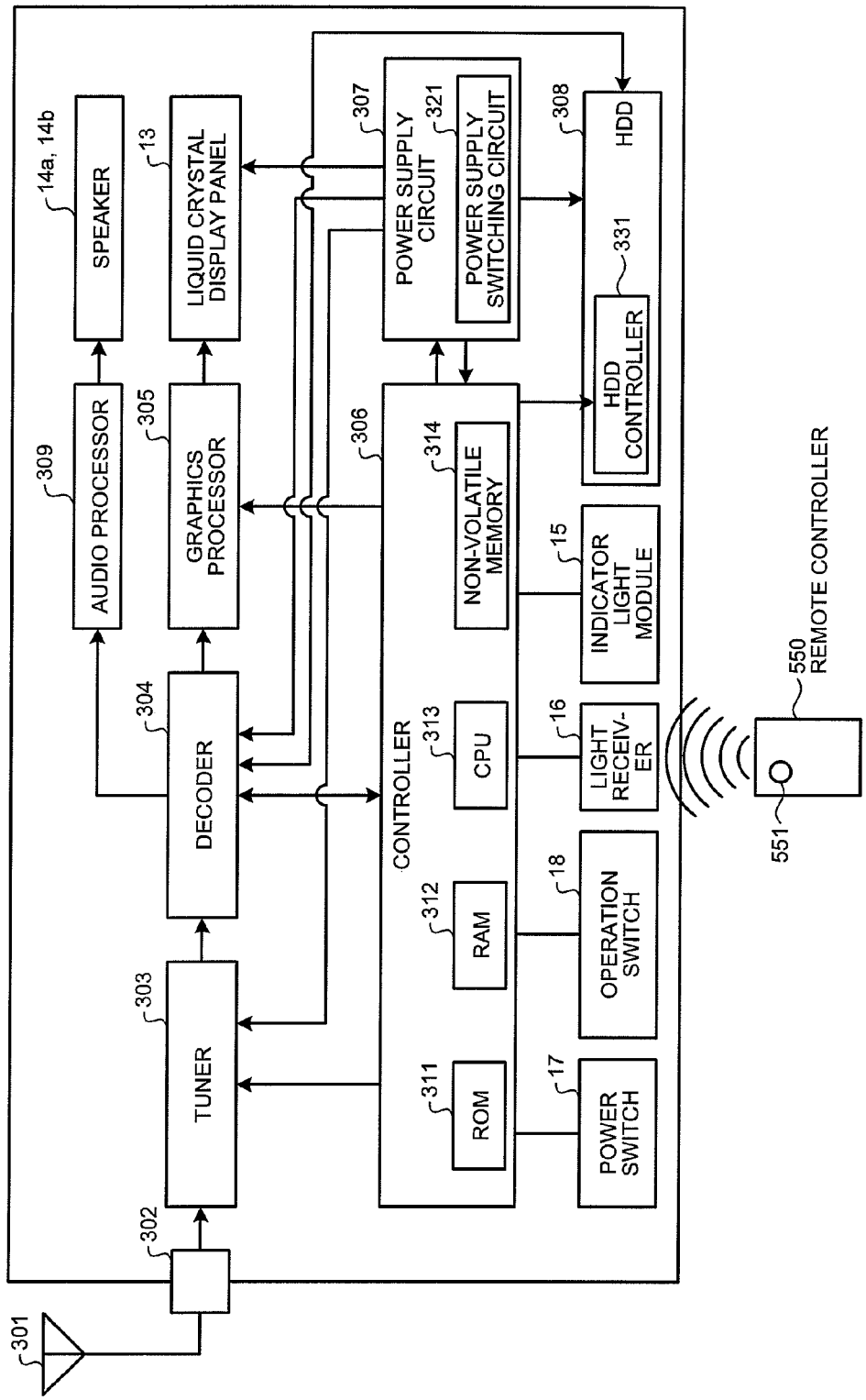
FIG. 5 is an exemplary block diagram of a hardware configuration of the digital TV broadcasting receiver in the first embodiment.

A hardware configuration of the digital TV broadcasting receiver 100 is explained. FIG. 5 is a block diagram of a hardware configuration of the digital TV broadcasting receiver 100.

A satellite digital TV broadcast signal received through an antenna 301 is input to a tuner 303 through an input terminal 302. Here, the antenna 301 receives a broadcasting satellite (BS)/communication satellite (CS) digital broadcasting, and the tuner 303 is for the satellite digital broadcasting.

The tuner 303 selects a broadcast signal of a desired channel by a control signal output from a controller 306, and outputs the selected broadcast signal to a decoder 304.

The decoder 304 demodulates the broadcast signal selected by the tuner 303 in response to the control signal output from the controller 306, and generates a digital video signal and a digital audio signal corresponding to a desired program by depacketing.

Further, the decoder 304 selectively performs predetermined digital signal processing on the generated digital video signal and the generated digital audio signal, and outputs the digital video signal to a graphics processor 305 as well as outputs the digital audio signal to an audio processor 309. Here, the decoder 304 can also output the generated digital video signal and the generated digital audio signal to the controller 306.

The digital video signal and the digital audio signal to which the predetermined digital signal processing is performed and output from each of the decoder 304 and the controller 306 are stored in a hard disk drive (HDD) 308. When the recorded program is to be played, the decoder 304 performs predetermined digital signal processing on the data corresponding to the recorded program read out from the HDD 308 through the controller 306, and outputs the processed data to the graphics processor 305 and the audio processor 309.

The controller 306 generates an image for displaying an electronic program guide (EPG) and/or captions, based on EPG information or based on operations through a remote controller 550 and the operation switch 18. Then, the controller 306 outputs information on the generated image to the graphics processor 305, and also instructs the graphics processor 305 to display the image information.

Further, the controller 306 controls recording and timer recording. Upon receipt of a request for timer recording, the controller 306 displays the EPG information on the LCD panel 13. Then, the controller 306 stores the content corresponding to the timer recording input by a user through the remote controller 550 and the like. Then, the controller 306 controls the tuner 303 and the decoder 304 so as to record the program at a predetermined time.

The graphics processor 305 synthesizes the digital video signal output by an audio visual (AV) decoder (not illustrated) of the decoder 304, and the EPG and the captions generated by the controller 306. Then, the graphics processor 305 converts the synthesized digital video signal to an analog video signal that is displayable on the LCD panel 13, and outputs the analog video signal to the LCD panel 13 so as to display the analog video signal on the LCD panel 13. When the captions of caption broadcasting are to be displayed in response to the control of the controller 306, the graphics processor 305 superimposes the caption information on the image signal.

The audio processor 309 converts the input digital audio signal to an analog audio signal that is playable by the speakers 14a and 14b, and outputs the analog audio signal to the speakers 14a and 14b so as to play the audio.

A power supply circuit 307 has a power supply switching circuit 321, and supplies power to all modules included in the digital TV broadcasting receiver 100, such as the tuner 303, the decoder 304, the LCD panel 13, the HDD 308, and the controller 306. The power supply circuit 307 may employ any power supply techniques such as an alternating current (AC) adapter.

The power supply switching circuit 321 connects or disconnects the power supply circuit 307 to at least one of the tuner 303 and the decoder 304, in accordance with a power supply control signal output by the controller 306. The power supply control signal is input to the power supply circuit 307 in response to the processing by the controller 306.

As mentioned before, the power supply switching circuit 321 supplies power to all modules included in the digital TV broadcasting receiver 100. Hence, when the power supply to the tuner 303 or the decoder 304 is stopped, those modules are initialized.

All operations including the aforementioned various receiving operations of the digital TV broadcasting receiver 100 are controlled by the controller 306. The controller 306 has therein an embedded central processing unit (CPU). The controller 306 receives operation information transmitted from a remote controller 550 and the like through a light receiver 16, and controls each module so that the each module is operated in accordance with the operation information (for example, an operation to switch a channel and the like).

The remote controller 550 has various operation buttons such as a power button 551 and the like. It should be noted here that the power button 551 of the remote controller 550 and the power button 17 on the operation section 30 provided on the side face of the digital TV broadcasting receiver 100 have different function.

The controller 306 obtains various switch statuses and operation information of a user, based on a signal input through the power switch 17, the various operation switch 18, and the light receiver 16. Further, the controller 306 controls lighting of the various indicators provided in the indicator light module 15.

The controller 306 mainly utilizes a CPU 313, a read only memory (ROM) 311, a random access memory (RAM) 312, and a non-volatile memory 314 such as a flash memory. The ROM 311 stores a control program including an initialization control program which is executed by the CPU 313. The RAM 312 provides a work area for the CPU 313. The non-volatile memory 314 is a memory to which various setup information, control information, and program information are stored.

Figure 6:
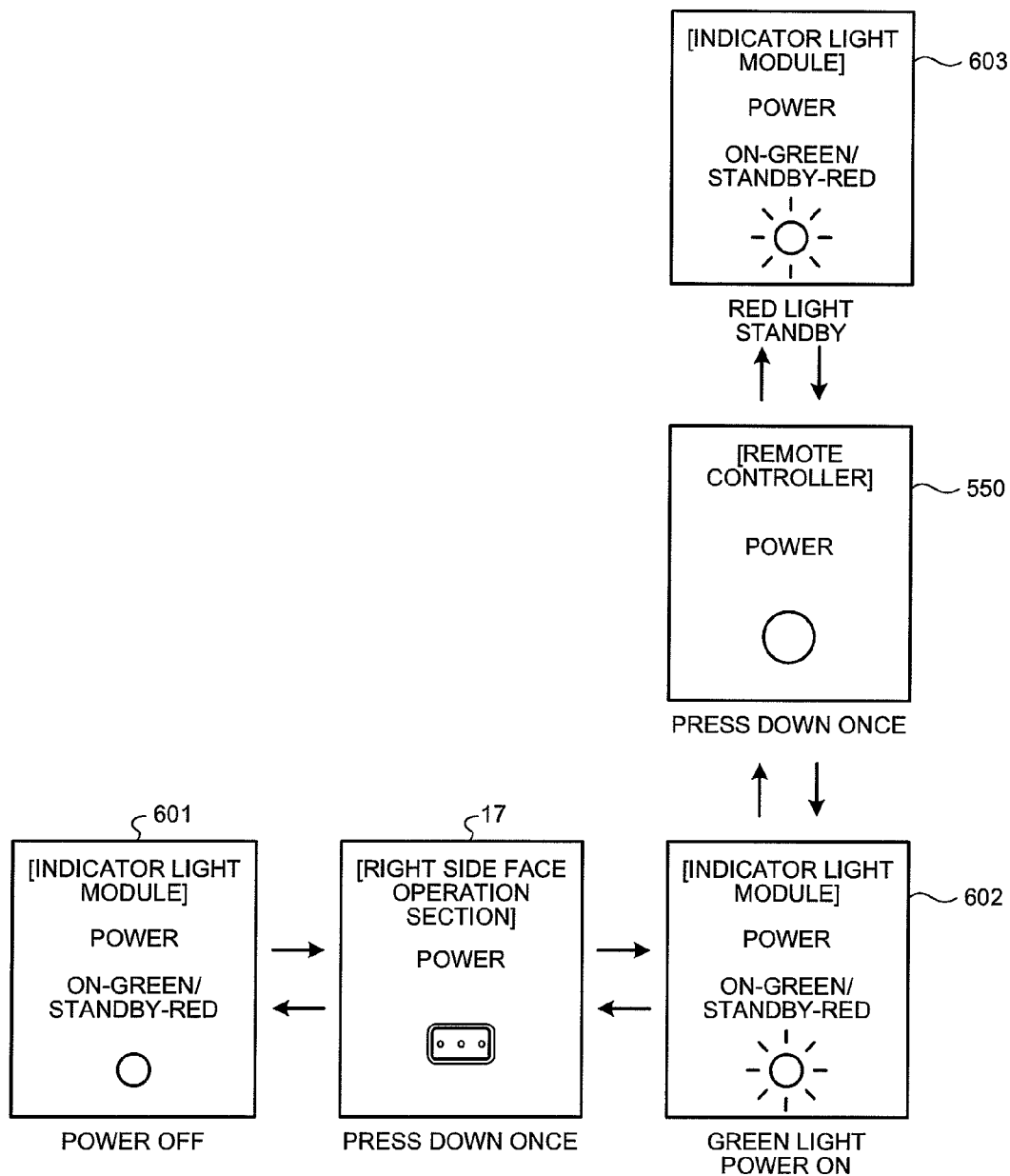
FIG. 6 is an exemplary explanatory diagram illustrating changes of a power indicator when the digital TV broadcasting receiver is operated by the operation section or a remote controller in the first embodiment.

Next, changes in the lighting of the power indicator 15a when the digital TV broadcasting receiver 100 is operated by a user in a usual manner through the operation section 30 and the like is explained. FIG. 6 is an explanatory diagram illustrating the changes in the power indicator 15a when the digital TV broadcasting receiver 100 is operated through the operation section 30 or the remote controller 550. As illustrated by the reference numeral 601 in FIG. 6, the power indicator 15a is off when the power of the digital TV broadcasting receiver 100 is "OFF." Then, as illustrated by the reference numeral 602, when the power switch 17 of the operation section 30 is pressed down once, the power of the digital TV broadcasting receiver 100 is turned "ON" and the power indicator 15a is turned on in green. When the power switch 17 of the operation section 30 is pressed down again while the power indicator 15a is turned on in green, the power is turned "OFF" and the power indicator 15a is turned off, as illustrated similarly by the reference numeral 601.

On the other hand, as illustrated by the reference numeral 602, when the power button 551 of the remote controller 550 is pressed down once while the power of the digital TV broadcasting receiver 100 is turned "ON," the power of the digital TV broadcasting receiver 100 is set to a standby mode and the power indicator 15a is turned on in red. Then, when the power button 551 of the remote controller 550 is pressed down while the power of the digital TV broadcasting receiver 100 is in the standby mode, the power is turned "ON" and the power indicator 15a is turned on in green, as illustrated by the reference numeral 602.

Figure 7:
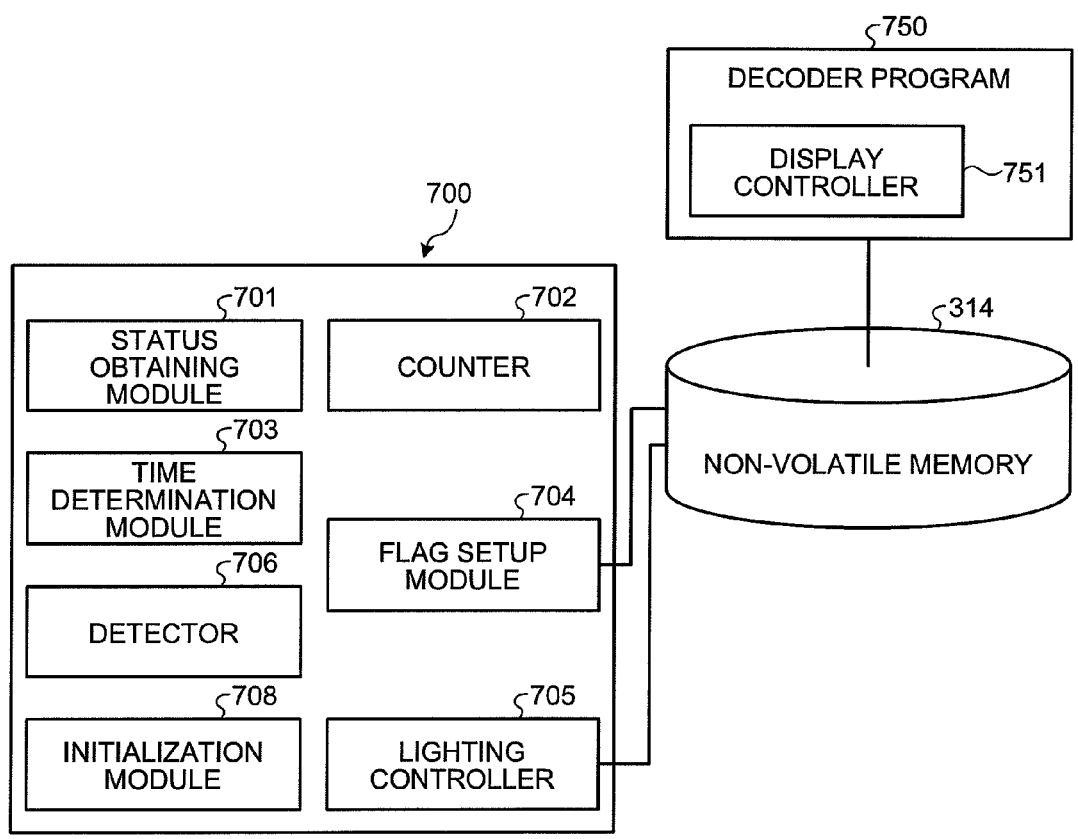
FIG. 7 is an exemplary block diagram of a software configuration realized by a controller of the digital TV broadcasting receiver to initialize an arbitrary module in the first embodiment.

FIG. 7 is a block diagram of a software configuration (initialization control program) configured to initialize an arbitrary module. This software configuration is realized by the controller 306 of the digital TV broadcasting receiver 100. As illustrated in FIG. 7, in the digital TV broadcasting receiver 100, an initialization control program 700 controls the lighting of the power indicator 15a and initializes modules specified by the user operation, by using an initialization flag stored in the non-volatile memory 314. In the first embodiment, a module to be initialized is the decoder 304. However, a module other than the decoder 304 may be initialized.

The initialization flag stored in the non-volatile memory 314 illustrated in FIG. 7 is a flag indicating whether the initialization is to be performed (or whether the initialization was performed). A default value of the initialization flag is set to "0," which represents that the initialization is not to be performed (or represents that the initialization was not performed). On the other hand, the initialization flag of "1" represents that the initialization is to be performed (or represents that the initialization was performed).

As illustrated in FIG. 5, the digital TV broadcasting receiver 100 has the controller 306 including the CPU 313. Further, the digital TV broadcasting receiver 100 has a storage module such as the ROM 311 in which the initialization control program 700 configured to perform the initialization in the digital TV broadcasting receiver 100 is stored, and the RAM 312 that is a work space for the CPU 313. The controller 306 and the program stored in the ROM 311 cooperatively realize, on the controller 306, modules including a status obtaining module 701, a counter 702, a time determination module 703, a flag setup module 704, a lighting controller 705, a detector 706, and an initialization module 708 illustrated in FIG. 7.

The status obtaining module 701 obtains, from the signal input from the power switch 17 and the operation switch 18, statuses of the power switch 17 and the operation switch 18. Further, the status obtaining module 701 obtains, from the light receiver 16, operation information from the remote controller 550. The statuses of the power switch 17 and the operation switch 18 includes, for example, "pressed down" and "released" (not being pressed down).

The counter 702 starts counting when the status of the power switch 17 becomes "pressed down," and continues to count until the status becomes "released."

The time determination module 703 determines whether an input time during which the power switch 17 is kept being pressed down (input) passes a predetermined time. In the first embodiment, the predetermined time is set to 10 seconds. Consequently, input error of a user can be prevented since the time until when it is determined that the power switch 17 is being pressed down is set long.

The flag setup module 704 sets the initialization flag stored in the non-volatile memory 314 based on the determination result of the time determination module 703. In the first embodiment, the initialization flag is set to "1" when the time determination module 703 determines that the input time passes 10 seconds.

When it is determined that the input time passes 10 seconds, the lighting controller 705 controls the power indicator 15a so as to be turned on in green. In particular, the lighting controller 705 refers to the initialization flag stored in the non-volatile memory 314, and controls the power indicator 15a to be turned on in green when the initialization flag is set to "1." Then, when a signal indicating that the power switch 17 is released is input by the detector 706, the lighting controller 705 controls the power indicator 15a to be turned off.

Figure 8:
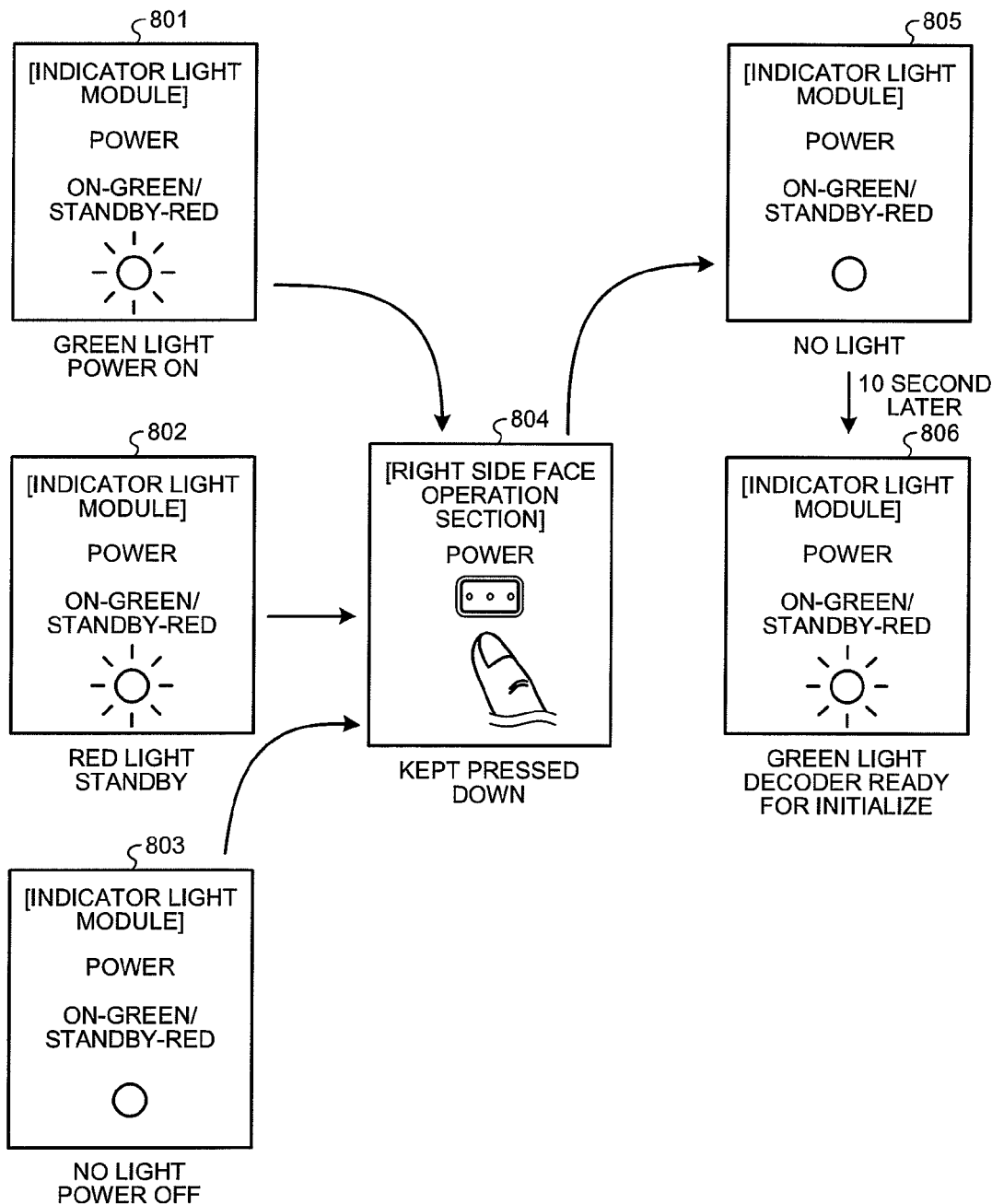
FIG. 8 is an exemplary explanatory diagram illustrating changes of power indicator when the power switch is kept pressed down in the first embodiment.

FIG. 8 is an explanatory diagram illustrating changes in the lighting of the power indicator 15a when the power switch 17 is kept being pressed down. The example illustrated by FIG. 8 is on the basis that the decoder 304 is uncontrollable. This means that, even when the power button 551 of the remote controller 550 is pressed down once, or even when the power switch 17 on the operation section 30 is pressed down once, the decoder 304 cannot be initialized since the power is continued being supplied to the decoder 304. In other words, the state 801 in which the power is turned on and the power indicator 15a is turned on in green, the state 802 in which the power is set to be in the standby mode and the power indicator 15a is turned on in red, and the state 803 in which the power is turned off and the power indicator 15a is turned off, cannot fix the decoder 304 from the uncontrollable state.

Therefore, as illustrated in FIG. 8, the power button 551 of the operation section 30 is pressed down as illustrated by the reference numeral 804, from the state 801, the state 802, and the state 803. Right after the power button 551 is pressed down, the lighting controller 705 turns off the power indicator 15a as in a state 805. Subsequently, when the input time passes 10 seconds, the lighting controller 705 controls the power indicator 15a to be turned on in green, as in a state 806. This green light indicates that the decoder 304 is to be initialized. Accordingly, the user can surely confirm that the decoder 304 is to be initialized when the power switch 17 is released.

The initialization of the digital TV broadcasting receiver 100 of the first embodiment takes into account the telephone support service. That is to say, a user calls up a clerk in the telephone support service when the digital TV broadcasting receiver 100 becomes uncontrollable. In response, the clerk instructs the user to keep pressing down the power switch 17 for more than 10 seconds. As a result, when the power indicator 15a is turned on in green, the user and the clerk can both confirm the status (that is, the power switch is kept pressed down for more than 10 seconds) of the digital TV broadcasting receiver 100. Therefore, the clerk can confirm that the decoder 304 is appropriately to be initialized when the user releases the power switch 17.

The detector 706 detects that the power switch 17 is released from being pressed down. In the first embodiment, the detector 706 determines that the power switch 17 is released from being pressed down when the status of the power switch 17 obtained by the status obtaining module 701 is "released." When the status is determined as "released," the detector 706 outputs the status to the lighting controller 705 and the initialization module 708.

When the time determination module 703 determines that the input time passes 10 seconds and the detector 706 detects that the inputting is finished, the initialization module 708 initializes the decoder 304. In the first embodiment, when a signal indicating that the power switch 17 is released from being pressed down is input by the detector 706, the initialization module 708 refers to the initialization flag stored in the non-volatile memory 314. Then, when the initialization flag is set to "1," the initialization module 708 initializes the decoder 304.

The decoder 304 has an application specific integrated circuits (ASIC), a CPU, and the like, not illustrated. Further, the decoder 304 has a ROM and the like to which the decoder program 750 for displaying a dialogue during the boot process is stored. The ASIC, the CPU, and the like, and the program stored in the ROM 311, in combination, realize modules including the display controller 751.

During the boot process when the decoder 304 is initialized at the end of the last activation of the decoder 304, the display controller 751 controls the LCD panel 13 to display during the boot process a dialog (display screen) indicating that the initialization is performed. In particular, the display controller 751 of the first embodiment refers to the initialization flag. Then, when the initialization flag is set to "1," the display controller 751 controls the LCD panel 13 to display the dialog indicating that the initialization is performed. Subsequently, the display controller 751 sets the initialization flag to "0."

Figure 9:
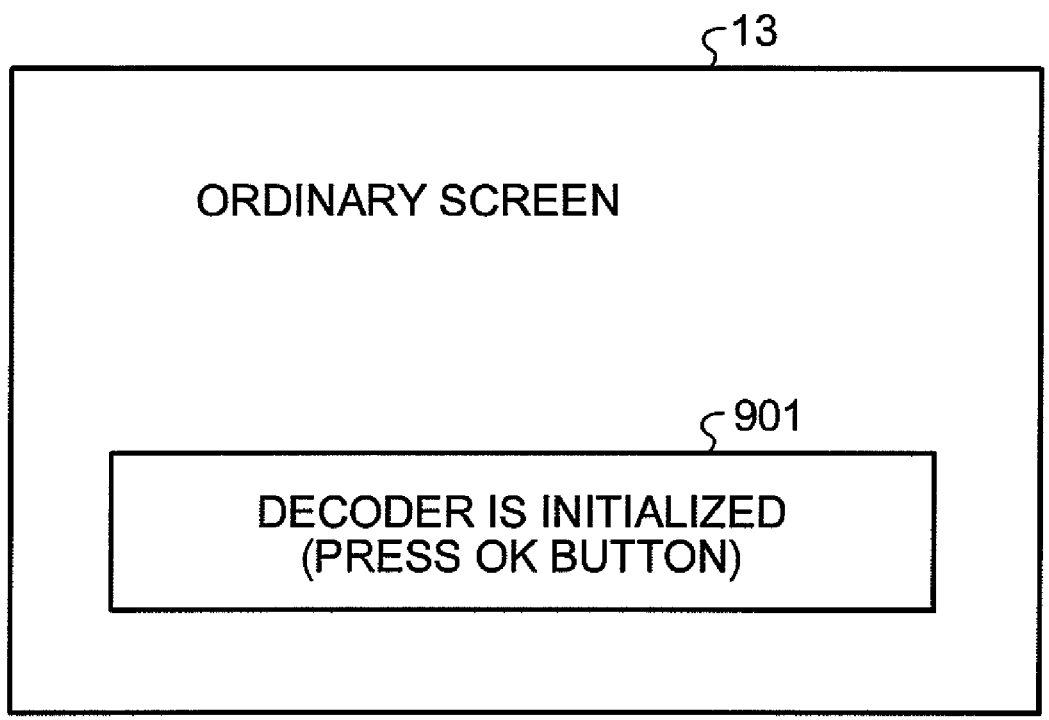
FIG. 9 is an exemplary schematic diagram of a screen displayed by a display controller of the digital TV broadcasting receiver after initialization in the first embodiment.

FIG. 9 is an explanatory diagram illustrating an example of a display displayed by the display controller 751 after the initialization is completed. As illustrated in FIG. 9, when the digital TV broadcasting receiver 100 is restarted after the initialization of the decoder 304 is completed, the display controller 751 displays the dialog and a massage 901 such as "decoder is initialized (press OK button)." Accordingly, the user can recognize that the decoder 304 is initialized.

Figure 10:
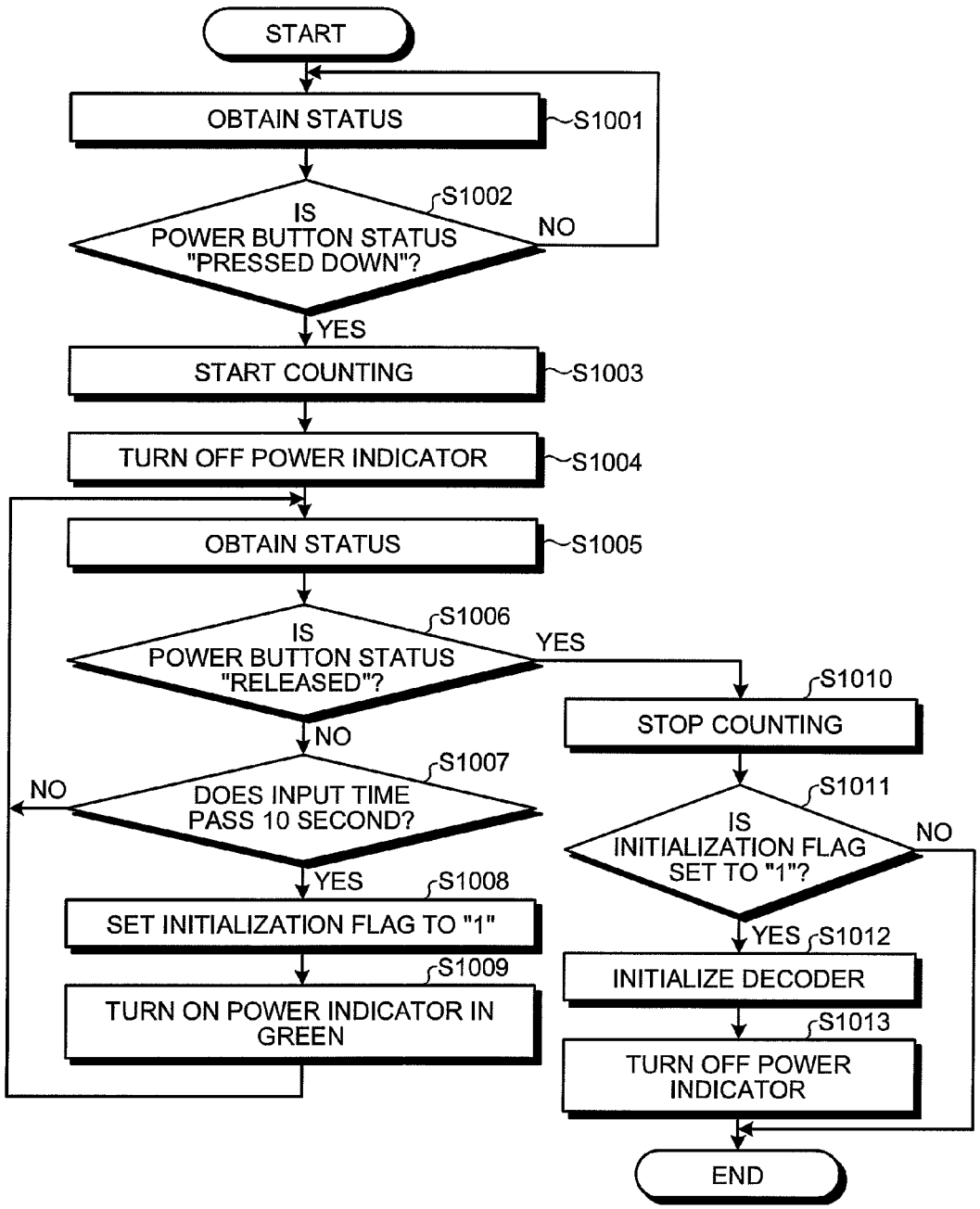
FIG. 10 is an exemplary flowchart of processing by the digital TV broadcasting receiver when the power button is pressed down in the first embodiment.

Next, processing of the digital TV broadcasting receiver 100 according to the first embodiment configured as mentioned above is explained for the case when the power switch 17 is pressed down. FIG. 10 is a flowchart of the processing.

First, the status obtaining module 701 obtains a status of the power switch 17 from a signal input by the power switch 17 (S1001).

Then, the counter 702 determines whether the status of the power switch 17 is "pressed down" (S1002). When it is determined that the status is not "pressed down" (No at S1002), the processing beginning with S1001 is repeated until the status becomes "pressed down."

When it is determined that the status is "pressed down" (Yes at S1002), the counter 702 starts counting (S1003).

Further, the lighting controller 705 controls the lighting of the power indicator 15a so as to be turned off (S1004). Then, the status obtaining module 701 obtains a status of the power switch 17 (S1005).

Next, the detector 706 determines whether the status of the power switch 17 obtained by the status obtaining module 701 is "released" (S1006). When it is determined that the status is not "released" (that is to say, the power switch 17 is kept being pressed down) (No at S1006), the time determination module 703 determines whether the time counted by the counter 702 exceeds 10 seconds (S1007). When it is determined that the time counted by the counter 702 does not exceed 10 seconds (No at S1007), the processing is repeated from S1005.

When the time determination module 703 determines that the input time exceeds 10 seconds (Yes at S1007), the flag setup module 704 sets the initialization flag to "1" (S1008). Then, when the initialization flag is set to "1," the lighting controller 705 controls the power indicator 15a to be turned on in green (S1009). Here, the power indicator 15a periodically refers to the initialization flag. Then, the processing beginning with S1005 is repeated.

On the other hand, when the detector 706 determines that the status of the power switch 17 obtained by the status obtaining module 701 is "released" (Yes at S1006), the counter 702 stops the counting (S1010).

Subsequently, the initialization module 708 determines whether the initialization flag is set to "1" (S1011). When it is determined that the initialization flag is not set to "1" (No at S1011), the processing illustrated in FIG. 10 ends.

On the other hand, when the initialization module 708 determines that the initialization flag is set to "1" (Yes at S1011), the initialization module 708 initializes the decoder 304 (S1012). That is to say, the initialization module 708 outputs a power control signal for stop supplying the power to the decoder 304 is output to the power supply circuit 307. Then, the power supply switching circuit 321 of the power supply circuit 307 stops the power supply to the decoder 304 in response to the input of the power control signal. As a result, the decoder 304 is initialized.

Upon receipt of the input from the detector 706, the lighting controller 705 turns off the power indicator 15a (S1013).

By the aforementioned processing, the power indicator 15a can be turned on so as to notify the user that the initialization can be performed as well as to initialize the decoder 304. According to the aforementioned processing, after a predetermined time (for example, 3 seconds) from when the power supply to the decoder 304 is stopped, the power is resupplied to the decoder 304. As a result, the boot process of the decoder 304 is started. Further, alongside with the aforementioned processing, the counter 702 is cleared.

Figure 11:
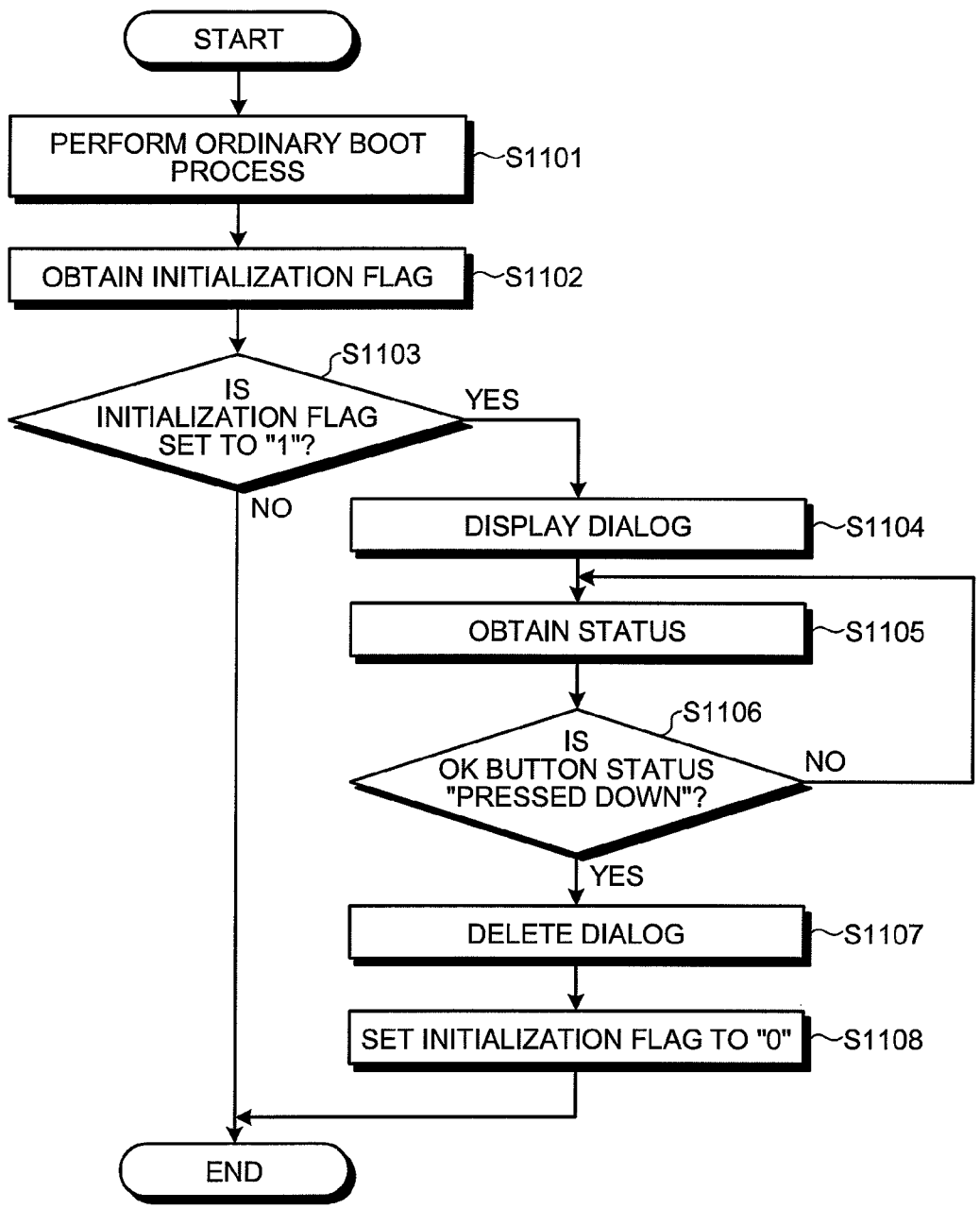
FIG. 11 is an exemplary flowchart of boot process of the digital TV broadcasting receiver in the first embodiment.

Next, processing including the boot process of the decoder 304 of the digital TV broadcasting receiver 100 according to the first embodiment configured as described above is explained. FIG. 11 is a flowchart of the processing.

First, the decoder 304 performs ordinary boot process (S1101). In the boot process, the decoder program 750 in the decoder 304 is also executed. Then, the display controller 751 provided as a part of the executed decoder program 750 obtains an initialization flag from the non-volatile memory 314 (S1102).

Then, the display controller 751 determines whether the obtained initialization flag is set to "1" (S1103). When the obtained initialization flag is not set to "1" (No at S1103), the processing in FIG. 11 ends after the ordinary boot process.

On the other hand, when the display controller 751 determines that the obtained initialization flag is set to "1," a dialog such as illustrated in FIG. 9 indicating that the decoder 304 is initialized is displayed (S1104).

Subsequently, the display controller 751 obtains the status of the OK button obtained by the status obtaining module 701 of the controller 306 (S1105). Here, the status of the OK button is contained in the operation information of the remote controller 550. Then, the display controller 751 determines whether the obtained status is "pressed down" (S1106). When the display controller 751 determines that the status of the OK button is not "pressed down" (No at S1106), the dialog is remain displayed, and the processing beginning with S1105 is performed again.

On the other hand, when the display controller 751 determines that the status of the OK button is "pressed down" (Yes at S1106), the display controller 751 performs the controlling to delete the dialog (S1107). Then, the display controller 751 sets the initialization flag stored in the non-volatile memory 314 to "0."

As a result of the aforementioned processing, the digital TV broadcasting receiver 100 according to the first embodiment indicates the execution (completion) of the initialization of the decoder in the system. Consequently, a user can surely be notified that the decoder is initialized.

In the first embodiment, the power indicator 15a is turned on in green. However, the power indicator 15a may be turned on in other colors, or may blink with certain interval. Further, in the first embodiment, the indicator light module 15 of the digital TV broadcasting receiver 100 has the plurality of LEDs as the indicator indicating the operation states of the digital TV broadcasting receiver 100. However, the indicator is not limited thereto, and may include any display device such as a liquid crystal display (LCD). Further, in the first embodiment, the indicator light module 15 indicates the operation states of the digital TV broadcasting receiver 100. However, the indicator light module 15 may display operation states of any other device such as a device connected to the network or a built-in device.

Further, according to the digital TV broadcasting receiver 100 of the first embodiment, the initialization is performed when the power switch 17 is kept being pressed down. However, various processing such as apparatus testing may be performed when the power switch 17 is kept being pressed down.

In the digital TV broadcasting receiver 100 according to the first embodiment, the decoder 304 that cannot be controlled can be initialized, by keep pressing down the power switch 17 provided on the main body for more than 10 seconds. Consequently, particularly in the digital TV broadcasting receiver 100 having a main power that cannot be shut down unless unplugging the power supply, load on the user can be alleviated because the initialization of the decoder requires no unplugging of the receiver. In addition, a miss operation of the receiver by the user can be prevented because the power switch 17 needs to be kept pressed down for more than the predetermined time for the initialization.

In addition, when the power switch 17 is kept pressed down for greater than or equal to 10 seconds, the power indicator 15a is turned on in green so that the user can be notified that the power switch 17 has been kept pressed down for greater than or equal to 10 seconds. Therefore, whether the decoder 304 can be initialized can be confirmed, and the user and the clerk providing the support service can communicate with each other in terms of condition of the apparatus.

Furthermore, in the first embodiment, the digital TV broadcasting receiver 100 displays the dialog indicating that the initialization was performed, after the decoder 304 is initialized. Therefore, the processing actually performed by the digital TV broadcasting receiver 100 can easily be confirmed.

Furthermore, in the first embodiment, the digital TV broadcasting receiver 100 notifies the user that the power switch 17 has been pressed down for greater than or equal to 10 seconds by the lighting of the power indicator 15a, instead of the LCD panel 13. As a result, complex display controlling becomes unnecessary in the digital TV broadcasting receiver 100, thereby the condition of the digital TV broadcasting receiver 100 can surely be notified even when other modules become uncontrollable. In addition, an electronic apparatus having no LCD panel can notify the user of the condition of the digital TV broadcasting receiver 100 by only providing the indicator, such as the LED.

The first embodiment is directed to initializing the decoder 304. However, a plurality of modules can be initialized. In a second embodiment, it is assumed that the tuner 303, the decoder 304, and the HDD controller 331 are to be initialized.

Figure 12:
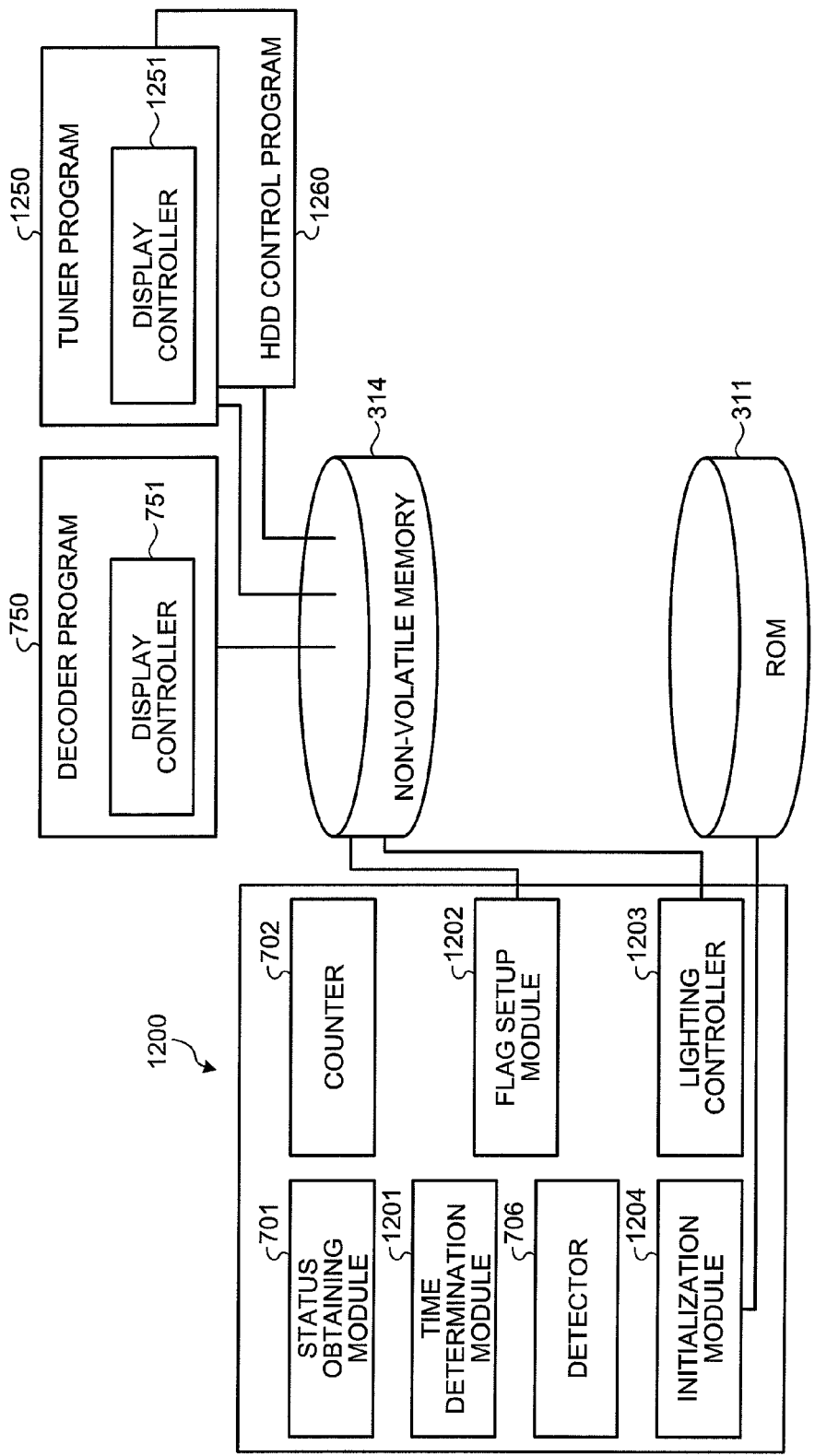
FIG. 12 is an exemplary block diagram of a software configuration for initializing an arbitrary module contained in a digital TV broadcasting receiver according to a second embodiment of the invention.

FIG. 12 is a block diagram of a software configuration for initializing an arbitrary module (device) included in a digital TV broadcasting receiver 100 according to the second embodiment.

An initialization flag stored in the non-volatile memory 314 indicates whether the initialization is to be performed (or the initialization was performed). A default value of the initialization flag is set to "0," and indicates that the initialization is not to be performed (or the initialization was not performed). The initialization flag that is set to "1" indicates that the decoder 304 is to be initialized (or the initialization was performed). The initialization flag that is set to "2" indicates that the tuner 303 is to be initialized (or the initialization had been performed). The initialization flag that is set to "3" indicates that a HDD controller 331 is to be initialized (or the initialization was performed).

The ROM 311 stores an initialization management table. FIG. 13 is a table configuration of the initialization management table. As illustrated in FIG. 13, the initialization management table stores the initialization flag, a lighting color, and an initialization target, in association with each other. The lighting color is a color of the power indicator 15*a* when it is turned on. The initialization target is a module that is to be initialized. Since the initialization flag, the lighting color, and the initialization target are associated with each other in the initialization management table, the lighting color of the power indicator 15*a* and the module to be initialized can be specified based on the initialization flag.

The digital TV broadcasting receiver 100 has the controller 306 having the CPU 313 and the like and a storage module such as the ROM 311 and the RAM 312. The ROM 311 stores therein an initialization control program 1200 for initializing the digital TV broadcasting receiver 100, and the RAM 312 is a work space for the processor. In the digital TV broadcasting receiver 100, the controller 306 and the program stored in the ROM 311 cooperate with each other to realize the status obtaining module 701, the counter 702, a time determination module 1201, a flag setup module 1202, a lighting controller 1203, the detector 706, and an initialization module 1204.

As illustrated in FIG. 12, the initialization control program 1200 differs from the initialization control program 700 of the first embodiment in that the initialization control program 1200 has the time determination module 1201 differing from the time determination module 703 in the processing, the flag setup module 1202 differing from the flag setup module 704 in the processing, the lighting controller 1203 differing from the lighting controller 705 in the processing, and the initialization module 1204 differing from the initialization module 708 in the processing. In the following, the same reference numerals are attached to the same configurations as that of the first embodiment, and the explanations thereof are omitted.

The time determination module 1201 determines whether the input time during which the power switch 17 has been pressed down (during which the power switch has been receiving input) exceeds a predetermined time. In the second embodiment, the predetermined time is set to 10 seconds, 20 seconds, and 30 seconds.

The flag setup module 1202 sets the initialization flag stored in the non-volatile memory 314 based on the determination result of the time determination module 1201. In the second embodiment, the initialization flag is set to "1" when the time determination module 1201 determines that the input time exceeds 10 seconds. Further, the initialization flag is set to "2" when the time determination module 1201 determines that the input time exceeds 20 seconds, and the initialization flag is set to "3" when the time determination module 1201 determines that the input time exceeds 30 seconds.

The lighting controller 1203 controls the power indicator 15*a* so as to change the color of the power indicator 15*a* every time when it is determined that the input time exceeds the predetermined times. Then, the lighting controller 1203 refers to the initialization flag, and controls the power indicator 15*a* to be turned on in a color associated with the initialization flag in the initialization management table. The aforementioned controlling by the lighting controller 1203 is performed until a signal indicating that the power switch 17 is released is input by the detector 706.

When the detector 706 detects the end of the input, the initialization module 1204 specifies the module to be initialized based on the input time, and subsequently initialize the module. In the second embodiment, upon the receipt of the input of the signal indicating that the power switch 17 is released from the detector 706, the initialization module 1204 refers to the initialization flag stored in the non-volatile memory 314, refers to the initialization target associated to the referred initialization flag in the initialization management table of the ROM 311, and initialize the module associated with the referred initialization target.

The tuner 303 includes the ASIC, the CPU, the ROM and the like. The ASIC and the CPU are not illustrated. The ROM stores therein a tuner program 1205 for displaying a dialog during the boot process. The ASIC and the CPU cooperate with the program stored in the ROM 311 so as to realize modules including a display controller 1251.

Similarly, regarding the HDD controller 331, the HDD controller program 1260 cooperates with the ASIC and the like to realize modules (not illustrated) including the display controller. Here, the display controller (not illustrated) of the HDD controller program 1260 performs similar processing as that of the display controller 1251 of the tuner program 1260 and the like, thereby the explanations thereof are omitted.

The processing for displaying the dialog by the display controllers 751 and 1251 include outputting the image information indicating the generated dialog to the controller 306, and commanding the controller 306 to display the generated dialog. Then, the controller 306 outputs the input image information to the graphics processor 305. Consequently, the image information containing the dialog is generated.

Figure 14:
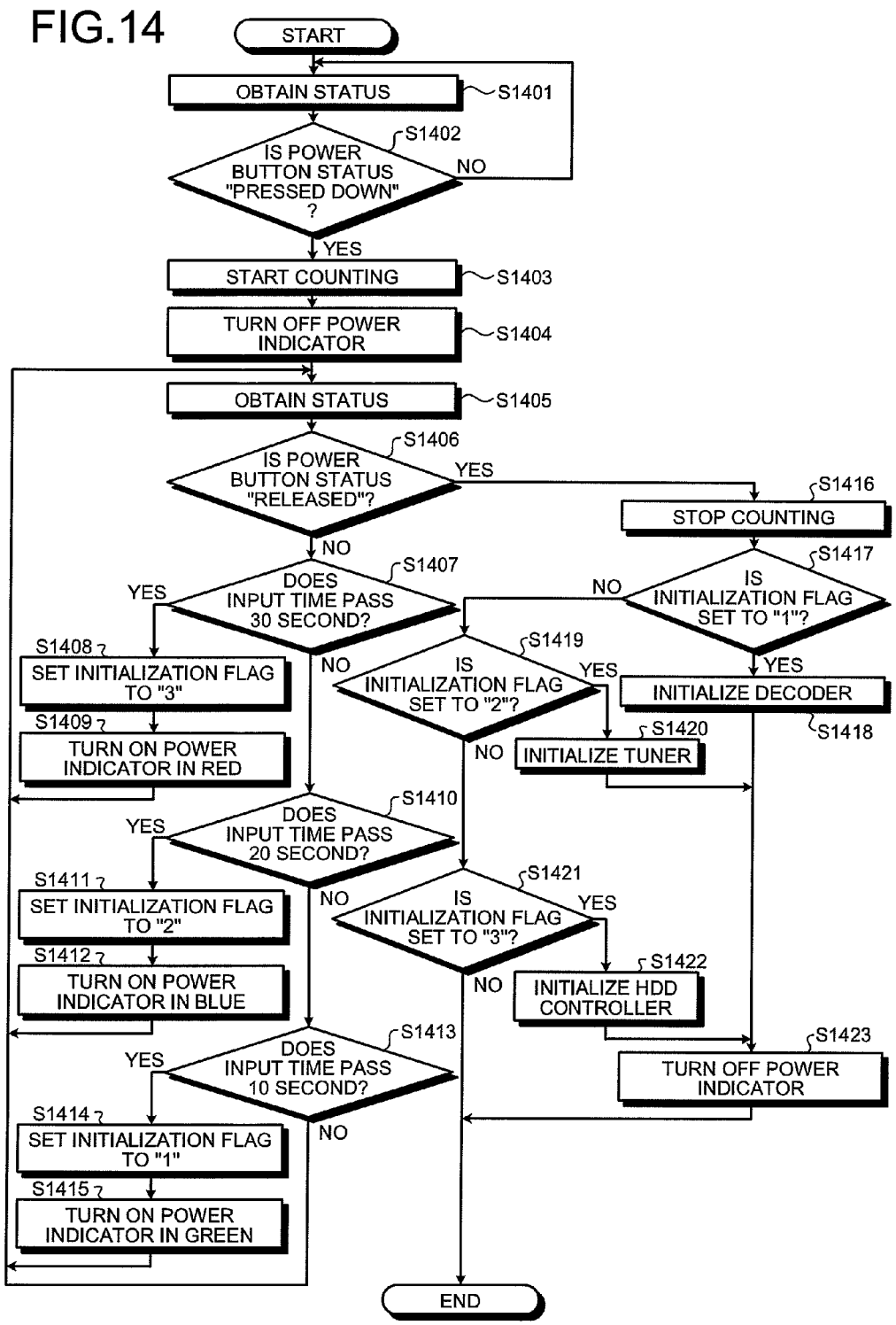
FIG. 14 is a flowchart of processing by the digital TV broadcasting receiver when a power switch is pressed down in the second embodiment.

Next, the processing of the digital TV broadcasting receiver according to the second embodiment configured as described above is explained for the case when the power switch 17 is pressed down. FIG. 14 is a flowchart of the aforementioned processing by the digital TV broadcasting receiver 100 of the second embodiment.

First, the processing in S1001 to S1005 in FIG. 10 of the first embodiment is performed, and subsequently, the status obtaining module 701 obtains the status of the power switch 17 (S1401 to S1405).

Then, the detector 706 determines whether the status of the power switch 17 obtained by the status obtaining module 701 is "released" (S1406). When the detector 706 determines that the status of the power switch 17 is not "released," or in other words, when the power switch is kept pressed down (No at S1406), the time determination module 1201 determines whether the input time counted by the counter 702 exceeds 30 seconds (S1407).

When the time determination module 1201 determines that the input time exceeds 30 seconds (Yes at S1407), the flag setup module 1202 sets the initialization flag to "3" (S1408). Then, when the initialization flag is set to "3," the lighting controller 705 controls the power indicator 15*a* so as to be turned on in red (S1409). Subsequently, the processing beginning with S1405 is performed again.

On the other hand, when the time determination module 1201 determines that the input time does not exceed 30 seconds (No at S1407), it is determined whether the input time counted by the counter 702 exceeds 20 seconds (S1410).

When the time determination module 1201 determines that the input time exceeds 20 seconds (Yes at S1410), the flag setup module 1202 sets the initialization flag to "2" (S1411). Then, when the initialization flag is set to "2," the lighting controller 705 controls the power indicator 15*a* so as to be turned on in blue (S1412). Thereafter, the processing beginning with S1405 is performed again.

On the other hand, when the time determination module 1201 determines that the input time does not exceed 20 seconds (No at S1410), it is determined whether the input time exceeds 10 seconds (S1413).

When the time determination module 1201 determines that the input time exceeds 10 seconds (Yes at S1413), the flag setup module 1202 sets the initialization flag to "1" (S1414). Then, when the initialization flag is set to "1," the lighting controller 1203 controls the power indicator 15*a* so that the power indicator 15*a* is turned on in green (S1415). Thereafter, the processing beginning with S1405 is performed again.

On the other hand, when the detector 706 determines that the status of the power switch 17 is "released" (Yes at S1406), the counter 702 stops counting (S1416).

Subsequently, the initialization module 1204 determines whether the initialization flag is set to "1" (S1417). When the initialization module 1204 determines that the initialization flag is set to "1" (Yes at S1417), the initialization module 1204 initializes the decoder 304 (S1418). Then, the lighting controller 1203 turns off the power indicator 15*a* in accordance with the input by the detector 706 (S1423), and complete the processing.

On the other hand, when the initialization module 1204 determines that the initialization flag is not set to "1" (No at S1417), the initialization module 1204 determines whether the initialization flag is set to "2" (S1419). As a result, when the initialization module 1204 determines that the initialization flag is set to "2" (Yes at S1419), the initialization module 1204 initializes the tuner 303 (S1420). Here, the initialization of the tuner 303 is performed similarly by stopping the power supply by the power supply switching circuit 321. Then, after the initialization of the tuner 303, the lighting controller 1203 turns off the power indicator 15*a* in accordance with the input by the detector 706 (S1423), and finishes the processing.

On the other hand, when the initialization module 1204 determines that the initialization flag is not set to "2" (No at S1419), the initialization module 1204 determines whether the initialization flag is set to "3" (S1421). As a result, when the initialization module 1204 determines that the initialization flag is set to "3" (Yes at S1421), the initialization module 1204 initializes the HDD controller 331 (S1422).

The controller 306 outputs a reset signal to the HDD controller 331 to forcibly initialize the HDD controller 331. Since the HDD controller 331 has a terminal for receiving the reset signal, the HDD controller 331 can forcibly be initialized even when the HDD controller 331 becomes uncontrollable. As mentioned above, the initialization by the digital TV broadcasting receiver 100 according to the second embodiment is not limited to the initialization by controlling the power supply. In other words, the initialization by the digital TV broadcasting receiver 100 may be performed as long as the initialization is forcibly performed.

After the HDD controller 331 is initialized, the lighting controller 1203 turns off the power indicator 15*a* in accordance with the input by the detector 706 (S1423). Accordingly, the processing is completed.

On the other hand, when the initialization module 1204 determines that the initialization flag is not set to "3" (No at S1421), the processing is to be finished without performing any processing.

In accordance with the aforementioned processing, the user can initialize the module indicated as the initialization target after the initialization target is confirmed by the lighting color of the power indicator 15*a*.

In addition to the aforementioned processing, the power supply switching circuit 321 stops the power supply to the decoder 304 or the tuner 303, and after a predetermined time (for example, 3 seconds), supplies again the power to the decoder 304 or the tuner 303. Accordingly, the boot process of the decoder 304 or the tuner 303 is started, and also the counter 702 is cleared.

Furthermore, when the HDD controller 331 is initialized, the boot process by the HDD controller 331 is performed because the power from the power supply circuit 307 is kept supplied.

Figure 15:
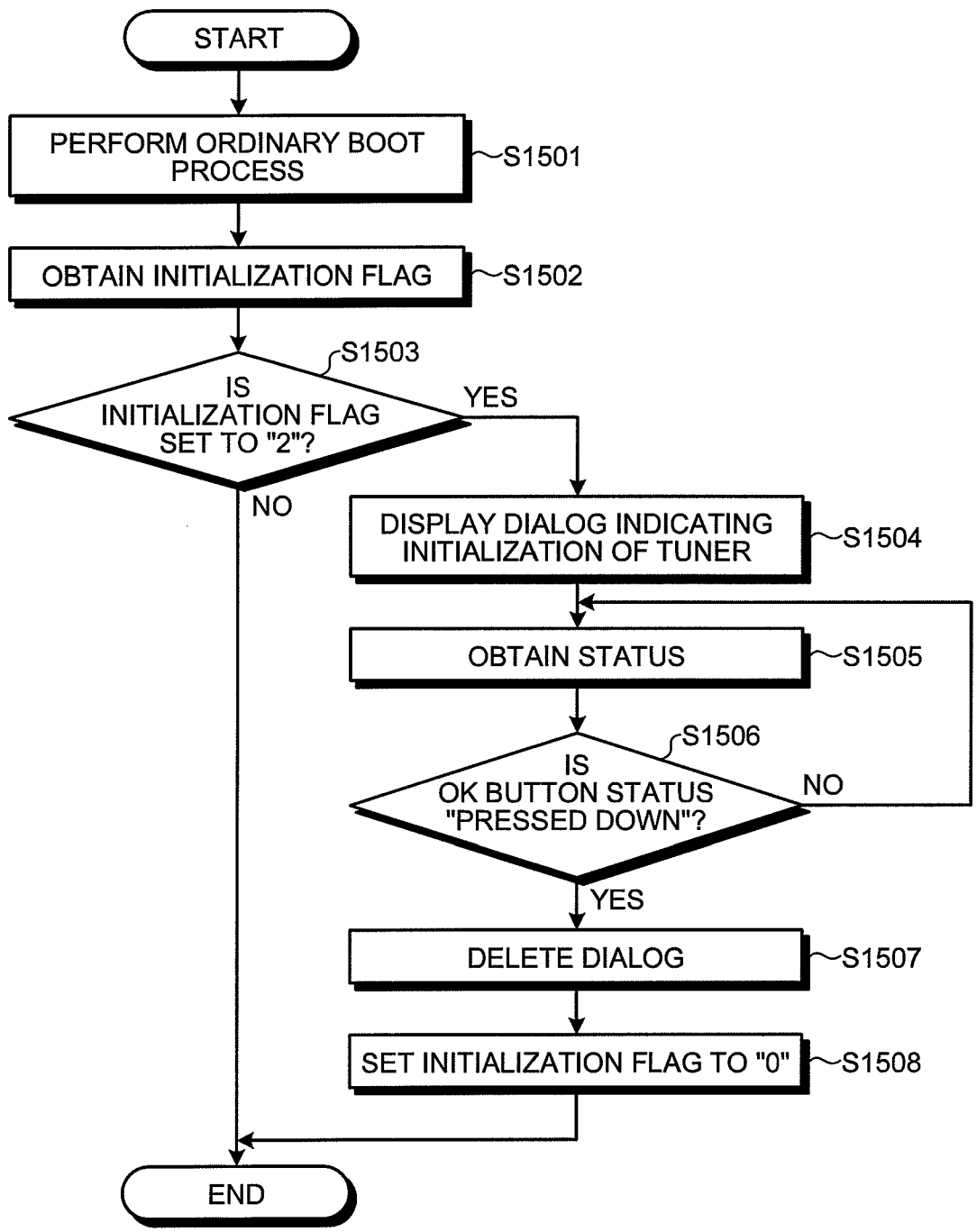
FIG. 15 is a flowchart of boot process by a tuner of the digital TV broadcasting receiver in the second embodiment.

The boot process of the decoder 304 is similar to that illustrated in FIG. 11, so that the explanations thereof are omitted. The boot process of the tuner 303 of the digital TV broadcasting receiver 100 according to the second embodiment configured as described above is explained. FIG. 15 is a flowchart of the aforementioned processing by the digital TV broadcasting receiver 100 according to the second embodiment.

In the boot process illustrated in FIG. 11 of the decoder 304, it is determined in S1103 whether the initialization flag is set to "1." On the other hand, in the boot process illustrated in FIG. 15 of the tuner 303, the display controller 1251 determines whether the initialization flag is set to "2" (S1503). Furthermore, in S1104 of the boot process illustrated in FIG. 11 of the decoder 304, the dialog indicating that the decoder 304 is initialized is displayed. On the other hand, in the boot process illustrated in FIG. 15 of the tuner 303, a dialog indicating that the tuner 303 is initialized is displayed (S1504). Besides, S1501, S1502, and S1505 to S1508 are similar to S1101, S1102, and S1105 to S1108 of FIG. 11, and the explanations thereof are omitted. In addition, the initialization of the HDD controller 331 is similar to the initialization of the tuner 303 or the decoder 304 illustrated in FIG. 11 or FIG. 15, except for the initialization flag (whether the initialization flag is set to "3") and the content displayed on the dialog. Therefore, the explanations thereof are omitted.

In the second embodiment, the display control of the dialog is performed for each module when the boot process of the each module is performed. However, the controller 306 may perform the display control of the dialog.

As described above, in the second embodiment, the initialization target are changed in accordance with the time during which the power switch 17 is kept pressed down, and changes the lighting color of the power indicator 15*a*. Consequently, the user can confirm the lighting color of the power indicator 15*a* while pressing down the power switch 17, thereby the user can easily recognize which module is to be initialized.

This is particularly useful for the telephone user support. That is to say, a user support clerk can ask the user to press down the power switch 17, and to release the power switch 17 when the lighting color of the power indicator 15*a* is changed to a predetermined lighting color, thereby a particular module can easily be initialized. In addition, the user operation is quite simple so that there are less operational errors. Furthermore, even when the operational error is caused, the user is only required to let the clerk know the lighting color of the power indicator 15*a* so that the clerk can specify which operation was performed.

Furthermore, the clerk can instruct the user to initialize a certain module via telephone. Accordingly, a module having a problem can be specified. Therefore, the module having a problem can easily be specified, and the problem can easily be fixed.

The initialization control program executed in the digital TV broadcasting receiver of the aforementioned embodiments is preliminarily stored in a ROM and the like, and provided.

On the other hand, the initialization control program may be stored in a memory medium readable by a computer such as a compact disk read only memory (CD-ROM), a flexible disk (FD), a compact disk recordable, and a digital versatile disk (DVD), in an installable or executable format, and provided.

Furthermore, the initialization control program may be stored on a computer connected to a network such as the Internet, and may be downloaded via the network to be provided. Furthermore, the initialization control program may be provided or distributed through the network such as the Internet.

The initialization control program includes the aforementioned modules (the status obtaining module, the counter, the time determination module, the flag setup module, the lighting controller, the detector, the initialization module). As an actual hardware, the CPU (processor) reads out the initialization control program from the ROM and executes the program. Accordingly, the aforementioned modules are loaded on a main memory device, and the status obtaining module, the counter, the time determination module, the flag setup module, the lighting controller, the detector, and the initialization module are generated on the main memory device.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus, comprising:
   an indicator configured to indicate an operation status of a device;
   a switch configured to receive an input from a user;
   a time determination module configured to determine whether a duration while the input is continually received by the switch exceeds a first predetermined time, and to determine whether the duration exceeds a second predetermined time longer than the first predetermined time;
   a lighting controller configured to turn on the indicator in a first lighting pattern when the time determination module determines that the duration exceeds the first predetermined time, and to switch the first lighting pattern to a second lighting pattern to turn on the indicator in the second lighting pattern when the time determination module determines that the duration exceeds the second predetermined time;
   a detector configured to detect when reception of the input by the switch is ended; and
   a processor configured to execute a first initialization associated with a first duration representing the duration longer than or equal to the first predetermined time and shorter than the second predetermined time when the detector detects continuous reception of the input by the switch during the first duration is ended while the indicator has been turned on in the first lighting pattern, and to execute a second initialization associated with a second duration representing the duration longer than the second predetermined time when the detector detects continuous reception of the input by the switch during the second duration is ended while the indicator has been turned on in the second lighting pattern.

2. The electronic apparatus of claim 1, wherein
   the switch comprises a power switch configured to start and stop supplying power to the electronic apparatus, and
   the first initialization is an initialization of a module in the electronic apparatus.

3. The electronic apparatus of claim 1, further comprising a display controller configured to control a display to indicate that the first initialization has been executed, after the first initialization is executed.

4. The electronic apparatus of claim 1, wherein the first predetermined time is longer than or equal to 10 seconds.

5. A control method applied to an electronic apparatus comprising an indicator and a switch, the indicator configured to indicate an operation status of a device, the switch configured to receive an input from a user, the control method comprising:
   determining, by a time determination module, whether a duration while the input is continually received by the switch exceeds a first predetermined time, and determining whether the duration exceeds a second predetermined time longer than the first predetermined time;
   turning on, by a lighting controller, the indicator in a first lighting pattern when the time determination module determines that the duration exceeds the first predetermined time, and switching the first lighting pattern to a second lighting pattern to turn on the indicator in the second lighting pattern when the time determination module determines that the duration exceeds the second predetermined time;
   detecting, by a detector, an end of the input received by the switch; and
   executing, by a processor, a first initialization associated with a first duration representing the duration longer than or equal to the first predetermined time and shorter than the second predetermined time when the detector detects continuous reception of the input by the switch during the first duration is ended while the indicator has been turned on in the first lighting pattern, and to execute a second initialization associated with a second duration representing the duration longer than the second predetermined time when the detector detects continuous reception of the input by the switch during the second duration is ended while the indicator has been turned on in the second lighting pattern.

* * * * *